United States Patent [19]
Whitecar et al.

[11] Patent Number: 5,784,466
[45] Date of Patent: Jul. 21, 1998

[54] CO-CHANNEL INTERFERENCE DETECTOR

[75] Inventors: John Elliott Whitecar; Richard Bruce Harris, both of Plymouth, Mich.

[73] Assignee: Ford Motor Company, Dearborn, Mich.

[21] Appl. No.: 783,722

[22] Filed: Jan. 16, 1997

[51] Int. Cl.⁶ .................................................. H04H 5/00
[52] U.S. Cl. .......................... 381/15; 455/303; 455/312; 455/296
[58] Field of Search .................. 381/15, 16; 455/296, 455/303, 306, 312; 375/346, 349

[56] References Cited

U.S. PATENT DOCUMENTS 4,504,966  3/1985  Hershberger ........................ 381/15

*Primary Examiner*—Forester W. Isen
*Attorney, Agent, or Firm*—Mark L. Mollon, Esq.; Roger L. May, Esq.

[57] ABSTRACT

An interference detection assembly is disclosed for detecting interference generated from a plurality of signals received by a receiver having a single output signal, the interference detection assembly including a synchronous demodulator having an input line electrically connected to a receiver to receive the single output signal therefrom, the synchronous demodulator converting the single output signal to generate an intermediate frequency signal, the synchronous demodulator having a Q-channel output transmitting a phase of the single output signal out therefrom, and a pilot detector electrically connected to the Q-channel output to receive the phase of the output signal to detect interference.

18 Claims, 3 Drawing Sheets

CO-CHANNEL INTERFERENCE DETECTOR

BACKGROUND OF THE INVENTION

The present invention relates in general to co-channel detection in audio systems, and more specifically, to an assembly that correctly identifies or detects co-channel interference to prevent an incorrect determination that a pilot tone or signal has been received indicating detection of a stereo tone or signal.

In the motor vehicle industry, a large effort is being devoted to the development of audio systems capable of receiving stereo signals in the AM frequency band. Detection of a stereo signal occurs in audio systems when the audio system detects a portion of the signal which is commonly referred to as the pilot tone. A problem associated with such technology is when an audio system equipped to detect a pilot signal mistakenly identifies two signals at the same frequency, which generate interference, to be signals having a pilot tone. This phenomenon, known as co-channeling interference, occurs often at night when signals in the AM frequency band are capable of propagating over enlarged geographic areas of transmission.

One attempt to solve this deficiency is disclosed in U.S. Pat. No. 4,489,431. This patent discloses a filter system which prevents a stereo system from enabling a stereo mode for AM frequency band signals. The filter system outputs a signal which, if greater than a predetermined value, enables a monophonic mode. This system is, however, incapable of differentiating between differing situations such as a noisy signal environment when a pilot tone indicating the existence of a stereo signal is actually present. Therefore, there is a need in the art to develop an audio system capable of detecting when a signal in the AM frequency band has a pilot tone and is not being interfered with by another signal or being degraded by a noisy environment.

SUMMARY OF THE INVENTION

The present invention has the advantage that co-channel detection capability is obtained such that the audio system is capable of determining the difference between a pilot tone in a stereo signal and co-channel interference.

The inventive assembly is an interference detection assembly for detecting interference generated from a plurality of signals received by a receiver having a single output signal. The interference detection assembly includes a synchronous demodulator having an input line electrically connected to the receiver to receive the single output signal therefrom. The synchronous demodulator modulates the single output signal to generate an intermediate frequency signal. The synchronous demodulator includes a Q-channel output for transmitting a phase of the single output signal therefrom. The interference detection assembly also includes a pilot detector electrically connected to the Q-channel output to receive the phase of the output signal to detect a pilot tone.

DETAILED DESCRIPTION OF PREFERRED EMBODIMENTS

Figure 1:
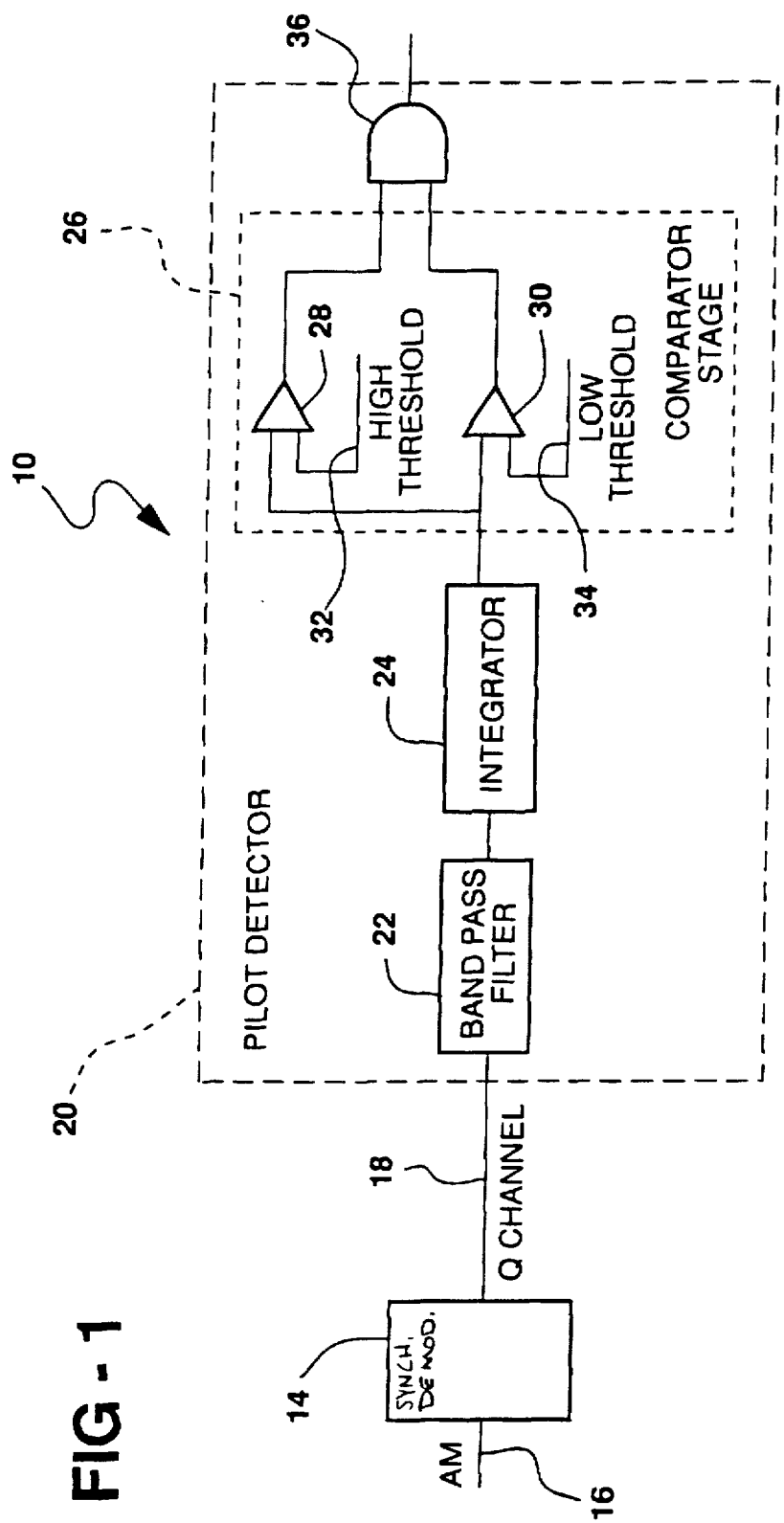
FIG. 1 is a block diagram of one embodiment of the present invention.

Referring to FIG. 1, an interference detection assembly is generally indicated at 10. The interference detection assembly 10 detects interference generated from a plurality of signals received by a receiver (not shown) having a single output signal. The plurality of signals received on a specific carrier frequency generates the co-channel interference phenomenon which may be interpreted by the receiver of an audio system (not shown) as a pilot tone indicating a stereo signal.

The interference detection assembly 10 includes a synchronous demodulator 14. The synchronous demodulator 14 includes an input line 16 electrically connected to the receiver to receive the single output signal therefrom. The synchronous demodulator 14 converts the single output signal to generate a zero Hertz (0 Hz) intermediate frequency signal. The intermediate frequency signal is output from the synchronous demodulator 14 through a Q-channel output line 18. The output along the Q-channel output line 18 is a quadrature or phase modulation of the single output signal.

The interference detection assembly 10 includes a pilot detector 20 electrically connected to the Q-channel output line 18. The pilot detector 20 receives the phase of the output signal to detect co-channel interference. More specifically, the pilot detector 20 includes a band pass filter 22 which directly receives the phase of the single output signal from the Q-channel output line 18. The band pass filter 22 defines a predetermined frequency band through which only signals having a frequency at or near that predetermined frequency may pass therethrough. In one embodiment, the predetermined frequency is 25 Hz and a Q of approximately eight. Once the signals pass through the band pass filter 22, an integrator 24 receives the signals and averages them to generate an average signal.

The pilot detector 20 also includes a comparator stage 26. The comparator stage 26 compares the average signal to threshold signals. The comparator stage 26 includes a high comparator 28 and a low comparator 30. The high comparator 28 compares the averaged signal against a high threshold signal input 32, whereas the low comparator 30 compares the average signal against a low threshold signal input 34. In one embodiment, the high threshold signal is fifty percent higher than the desired phase-modulated level and the low threshold signal is fifty percent below the desired phase-modulated level. Therefore, the threshold is from 2.5 percent to 7.5 percent of the maximum phase modulation of one radian. An AND gate 36 receives the output from each of the high comparator 28 and the low comparator 30. As should be well known to those skilled in the art, the output of the AND gate 36 will be a logic "high," indicating a valid pilot detection, when both outputs of the high comparator 28 and the low comparator 30 are a logic "high."

Figure 2:
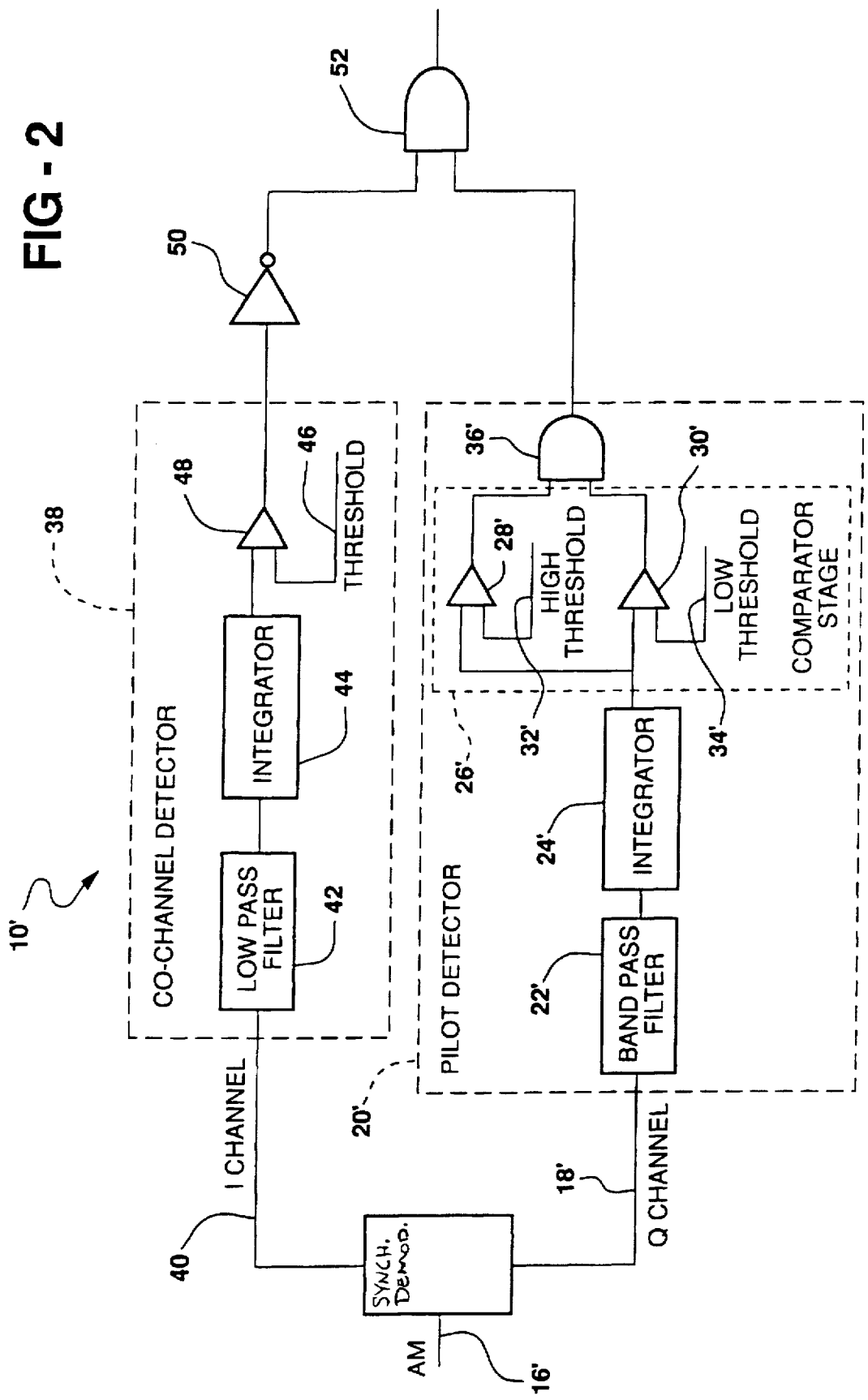
FIG. 2 is a block diagram of a second embodiment of the present invention.

Referring to FIG. 2 wherein like primed numerals represent similar elements to the embodiment shown in FIG. 1, the second embodiment of an interference detection assembly is generally indicated at 10'. In this embodiment, the interference detection assembly 10' includes a co-channel detector 38. The co-channel detector 38 is connected to the synchronous demodulator 14' through an I-channel output line 40. The I-channel output line 40 is used to transmit the in-phase amplitude modulation of the signal received from the receiver. Because the pilot tone used to identify a stereo signal is phase modulation only, modulation on the Q-channel output line 18 is the only modulation which should be present. More specifically, the pilot tone is not part of the amplitude modulation and, therefore, the signal across the I-channel output line 40 should not contain a pilot signal. Therefore, if the co-channel detector 38 detects modulation at or near the pilot frequency, co-channel interference is most likely the reason for this modulation.

The co-channel detector 38 includes a low pass filter 42. Because the frequency of interest is a low frequency, i.e., 25 Hz, the low pass filter 42 will only look at those modulations near 25 Hz. Once filtered, an integrator 44 averages the signal passed through the low pass filter 42. Once averaged, the signal is compared to a threshold signal from a threshold line 46 by a comparator 48.

The output of the co-channel detector 38 is received by an inverter 50. Because the output of the pilot detector 20' is positive or a logic high when a pilot tone is present, the output of the co-channel detector 38 is inverted to allow an output AND gate 52 to provide a positive, non-interference, "stereo-enable" signal if co-channel interference does not exist. If, however, co-channel interference existed, the output of the co-channel detector 38 would be positive. Once inverted by the inverter 50, the output of the output AND gate 52 would be negative, or a logic "low," identifying a situation as co-channel interference. If it is determined that co-channel interference exists, the audio system will be inhibited from entering into a stereo mode for the AM signal received by the receiver.

Figure 3:
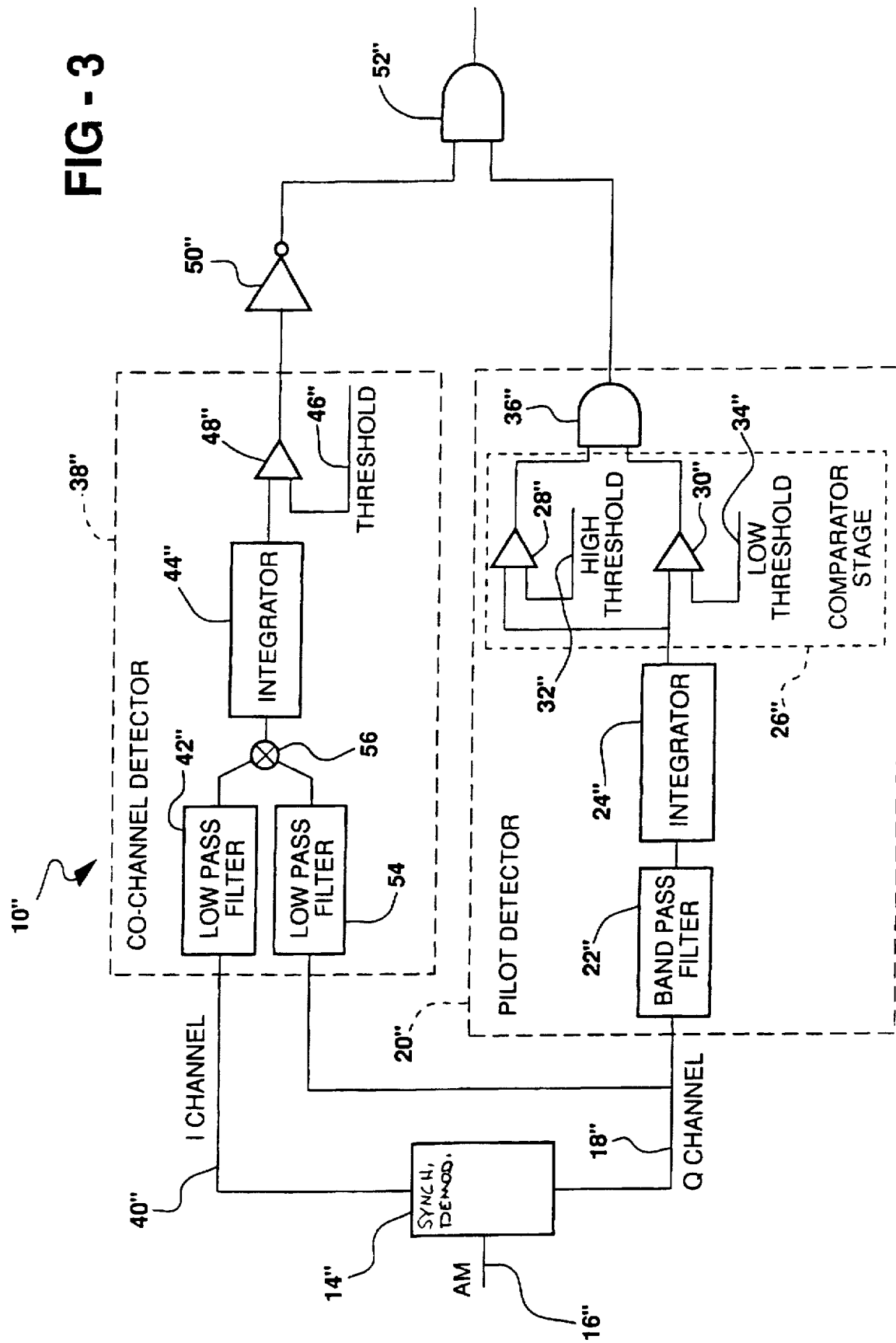
FIG. 3 is a block diagram of a third embodiment of the present invention.

Referring to FIG. 3 wherein like double primed numerals represent similar elements to those found in the preferred embodiment in FIG. 1 and the second embodiment found in FIG. 2, a third embodiment of a co-channel interference detection assembly is generally indicated at 10". The co-channel detector 38" includes two inputs, one from the I-channel output line 40" and one from the Q-channel output line 18". Each input is passed through a low pass filter 42", 54. The outputs of the low pass filters 42", 54 are correlated by a correlator 56. The correlation performed by the correlator 56 tests for modulation in the I-channel output line 40" relative to modulation in the Q-channel output line 18". If little or no phase correlation exists, a pilot tone may be present, but is being distorted by poor receiving conditions. If, however, there is a certain degree of phase correlation between the I-channel output line 40" and the Q-channel output line 18", then low frequency modulation of the I-channel output line 40" represents co-channel interference is occurring and the audio system will be inhibited from entering a stereo mode.

What is claimed is:

1. An interference detection assembly for detecting interference generated from a plurality of signals received by a receiver having a single output signal, said interference detection assembly comprising:

a synchronous demodulator having an input line electrically connected to the receiver to receive the single output signal therefrom, said synchronous demodulator modulating the single output signal to generate an intermediate frequency signal, said synchronous demodulator having a Q-channel output for transmitting a phase of the single output signal therefrom;

a pilot detector electrically connected to said Q-channel output to receive the phase of the output signal to detect interference;

said synchronous demodulator including an I-channel output; and a co-channel detector electrically connected to said I-channel output to produce a co-channel interference output signal.

2. An interference detection assembly as set forth in claim 1 wherein said pilot detector includes a band pass filter electrically connected to said Q-channel output, said band pass filter defining a predetermined frequency band and having a band pass output line to output each of the plurality of signals having the modulation frequency within the predetermined frequency band.

3. An interference detection assembly as set forth in claim 2 wherein said pilot detector includes an integrator electrically connected to said band pass output line for averaging signals received from said band pass filter to generate an average signal.

4. An interference detection assembly as set forth in claim 3 wherein said pilot detector includes a comparator stage to compare the average signal to a threshold signal.

5. An interference detection assembly as set forth in claim 4 wherein said comparator stage includes a high comparator having a high threshold input to compare the averaged signal thereagainst.

6. An interference detection assembly as set forth in claim 1 including an output AND gate electrically connected to said pilot detector and said co-channel interference detector providing a single output indicating an absence of interference.

7. An interference detection assembly for detecting interference generated from a plurality of signals received by a receiver having a single output signal, said interference detection assembly comprising:

a synchronous demodulator having an input line electrically connected to the receiver to receive the single output signal therefrom, said synchronous demodulator modulating the single output signal to generate an intermediate frequency signal, said synchronous demodulator having a Q-channel output for transmitting a phase of the single output signal therefrom;

a pilot detector electrically connected to said Q-channel output to receive the phase of the output signal to detect interference;

a co-channel detector electrically connected to said synchronous demodulator to produce a co-channel interference output signal; and an output AND gate electrically connected to said pilot detector and said co-channel interference detector providing a single output indicating an absence of co-channel interference and the presence of a pilot tone.

8. An interference detection assembly for detecting interference generated from a plurality of signals received by a receiver having a single output signal, said interference detection assembly comprising:

a synchronous demodulator having an input line electrically connected to the receiver to receive the single output signal therefrom, said synchronous demodulator modulating the single output signal to generate an intermediate frequency signal, said synchronous demodulator having a Q-channel output for transmitting a phase of the single output signal therefrom and an I-channel output for transmitting an amplitude modulated signal out therefrom;

a pilot detector electrically connected to said Q-channel output to receive the phase of the output signal to detect interference; and a co-channel detector electrically connected to said I-channel output of said synchronous demodulator to produce a co-channel interference output signal, said co-channel interference detector including a plurality of low pass filters each electrically connected to each of said Q-channel output and said I-channel output, each of said plurality of filters transmitting a low pass signal out therefrom.

9. An interference detection assembly as set forth in claim 8 wherein said co-channel interference detector includes a correlator to correlate the low pass signals transmitted by said low pass filters and to generate a correlated signal.

10. An interference detection assembly as set forth in claim 9 wherein said co-channel interference detector includes an integrator for averaging the correlated signal to generate an average signal.

11. An interference detection assembly for detecting interference generated from a plurality of signals received by a receiver having a single output signal, said interference detection assembly comprising:

a synchronous demodulator having an input line electrically connected to the receiver to receive the single output signal therefrom, said synchronous demodulator modulating the single output signal to generate an intermediate frequency signal, said synchronous demodulator having a Q-channel output for transmitting a phase of the single output signal therefrom;

a pilot detector electrically connected to said Q-channel output to receive the phase of the output signal to detect interference;

a co-channel detector electrically connected to said synchronous demodulator to produce a co-channel interference output signal;

said synchronous demodulator including an I-channel output providing said electrical connection to said co-channel detector;

an output AND gate electrically connected to said pilot detector and said co-channel interference detector providing a single output indicating an absence of interference; and an inverter electrically connected between said co-channel interference detector and said output AND gate.

12. An interference detection assembly as set forth in claim 11 wherein said co-channel interference detector includes a second electrical connection connected to said I-channel output of said synchronous demodulator.

13. An interference detection assembly as set forth in claim 12 wherein said co-channel interference detector includes a plurality of low pass filters each electrically connected to each of said Q-channel output and said I-channel output, each of said plurality of filters transmitting a low pass signal out therefrom.

14. An interference detection assembly as set forth in claim 13 wherein said co-channel interference detector includes a correlator to correlate the low pass signals transmitted by said low pass filters and to generate a correlated signal.

15. An interference detection assembly as set forth in claim 14 wherein said co-channel interference detector includes an integrator for averaging the correlated signal to generate an average signal.

16. An interference detection assembly as set forth in claim 15 wherein said co-channel interference detector includes a co-channel comparator to compare the average signal to a threshold.

17. An interference detection assembly for detecting interference generated from a plurality of signals received by a receiver having a single output signal, said interference detection assembly comprising:

a synchronous demodulator having an input line electrically connected to the receiver to receive the single output signal therefrom, said synchronous demodulator modulating the single output signal to generate an intermediate frequency signal, said synchronous demodulator having a Q-channel output for transmitting a phase of the single output signal therefrom;

a pilot detector electrically connected to said Q-channel output to receive the phase of the output signal to detect interference;

said pilot detector including a band pass filter electrically connected to said Q-channel output, said band pass filter defining a predetermined frequency band and having a band pass output line to output each of the plurality of signals having the modulation frequency within the predetermined frequency band;

said pilot detector including an integrator electrically connected to said band pass output line for averaging signals received from said band pass filter to generate an average signal;

said pilot detector including a comparator stage to compare the average signal to a threshold signal;

said comparator stage including a high comparator having a high threshold input to compare the averaged signal thereagainst; and wherein said comparator stage includes a low comparator having a low threshold input to compare the averaged signal thereagainst.

18. An interference detection assembly as set forth in claim 17 including an AND gate electrically connected to said high comparator and to said low comparator to indicate an absence of the interference generated by the presence of the plurality of signals.

* * * * *